United States Patent [19]

Connors et al.

[11] Patent Number: 4,630,695

[45] Date of Patent: Dec. 23, 1986

[54] COMBINATORIAL WEIGHER EMPLOYING DOUBLE GROUP SPLIT LOGIC

[75] Inventors: Robert H. Connors, Chicago; James T. Williams, Wilmette, both of Ill.

[73] Assignee: Triangle Package Machinery Co., Chicago, Ill.

[21] Appl. No.: 703,343

[22] Filed: Feb. 20, 1985

[51] Int. Cl.⁴ .......................................... G01G 19/22
[52] U.S. Cl. ........................................ 177/1; 177/25
[58] Field of Search ................................. 177/1, 25

[56] References Cited

U.S. PATENT DOCUMENTS

| | | | |
|---|---|---|---|
| 4,385,671 | 5/1983 | Hirano | 177/25 |
| 4,396,078 | 8/1983 | Minamida et al. | 177/1 |
| 4,416,341 | 11/1983 | Hirano | 177/25 |
| 4,418,771 | 12/1983 | Henry et al. | 177/1 |
| 4,441,567 | 4/1984 | Hirano | 177/25 |
| 4,473,126 | 9/1984 | Hirano | 177/25 |
| 4,533,006 | 8/1985 | Minamida et al. | 177/25 |

Primary Examiner—George H. Miller, Jr.
Attorney, Agent, or Firm—Neuman, Williams, Anderson & Olson

[57] ABSTRACT

A weighing system for making up two discrete quantities of solid product, each having a preferred product weight, from a plurality of product holding chambers, without refilling such product holding chambers. Each weighing scale is efficiently used in every machine cycle. Source product is divided into a plurality of smaller quantities which are a fraction of the target weight. Each of the fractional weight quantities becomes part of a set for which all possible double discharge fractional weight combinations are determined. The first combination capable of providing two acceptable discharges of the target weight, or the preferred weight closest to the target weight, is selected. Thus, two packages are efficiently delivered for each scale cycle. Efficiency of scale usage is assured by ordered selection of the holding chambers from which the discharges are made.

9 Claims, 5 Drawing Figures

COMBINATORIAL WEIGHER EMPLOYING DOUBLE GROUP SPLIT LOGIC

BACKGROUND OF THE INVENTION

This invention relates to a method for providing, from a variety of product sources, including a bulk supply, a continuous double discharge of discrete quantities of product, with each quantity having a predetermined target weight, or a weight very close thereto. This is accomplished by dividing the source product into a plurality of smaller quantities that are a fraction of the target weight. Each of the fractional weight quantities becomes part of a set for which all possible double discharge fractional weight combinations are determined. A combination providing two discharges of the target weight, or of the preferred weight closest to the target weight, is selected. In many instances the preferred weight is that weight closest to but not less than the target weight; other criteria for selecting the preferred weight are possible. The selected double discharge fractional weight combination is then split into two acceptable discharges of discrete quantities of product. Electrical circuitry may be used to determine the possible weight combinations and select the combination providing the preferred weight.

Such method of achieving a desired weight of flowing product, as is disclosed and claimed in this application, is novel and provides a machine cycle rate which is more efficient and quicker than that previously provided by weighing machines.

As used herein, "package weight" is the actual weight of product which a weighing machine provides per package on any single machine cycle, "double product weight" is the actual weight of product which the weighing machine provides on any single machine cycle and is approximately twice the package weight, "target weight" is the weight of product which the user desires the weighing machine to provide per package on any single machine cycle, "fractional weight" is the weight of a fractional weight quantity available on any single machine cycle, "preferred product weight" is that combination of fractional weights which the user desires the weighing machine to use to make up the package weight on any single machine cycle, and an "acceptable weight" is a combination of fractional weights which results in a package weight within a range of weights predetermined by the user. As mentioned, the preferred weight is often defined as that combination of fractional weights which is closest to but not less than the target weight, but other criteria are possible. An acceptable weight is correspondingly often defined as a weight which is greater than the target weight but less than a known weight in excess of the target weight, but other criteria for this term are also possible.

In the past, weighing machines have been slow, inaccurate, expensive, and bulky. In addition, they have abused the product, failed to achieve acceptable weights, and suffered from reliability problems due to their complexity. In an effort to overcome such disadvantages, some recent weighing machines have used a series of bins or hoppers to collect product from a continuous product supply, such as a conveyor. Such machines convert the continuous product flow into a series of discrete product groups that are each deposited onto a scale and weighed. Preferably, each discrete product group weighs a fraction of the target weight so that a number of them must be combined to obtain the package weight. For instance, if target weight is 100 grams, the weighing machine might create ten discrete fractional weight groups, each having an arbitrary weight between approximately 10 grams and 30 grams. The machine considers the possible fractional weight combinations available by combining the discrete product groups and selecting the combination providing the preferred weight.

Such prior art weighers have utilized a circular scale arrangement and radial product feed. Product is supplied by a chimney or hopper feeding directly onto a central distribution cone. Not all product may be fed this way because it may fail to feed through the chimney or hopper, or it may be damaged by such a feed configuration. In other instances, product is supplied by a conveyor, which makes it difficult to match the linear discharge end thereof with the radial dispersion of the distribution cone. For instance, it is desirable for the product to discharge in a narrow stream onto the apex of the distribution cone, but this is difficult to achieve due to vagaries in product flow and the unique feeding characteristics of each product. Thus, some scales may be deprived of product or starved while others receive an excessive amount of product and are flooded. This adversely impacts the ability of the weigher to achieve satisfactory operation. When a scale is starved, it is effectively eliminated because it is empty and cannot contribute to the possible combinations available to attempt to make the target weight. When a scale is flooded, it reduces the number of additional discrete weights that may be added to attempt to meet the target weight, again reducing the possible combinations available in attempting to meet the target weight. If the flooding is severe it may overflow the scale or place a weight of product in the scale which exceeds the acceptable package weight, requiring manual intervention or shut-down. The incidence of such problems is greatly reduced with the present invention.

The apparatus used in the prior art to provide discrete weighted amounts of product usually require an excessive number of scales, which is unduly expensive, and do not utilize sufficient means to optimally regulate product flow to the scales. This can lead to an excess or insufficient amount of product in the scales. Such a condition reduces the number of combinations available from which to attempt to meet the target weight, thereby reducing the accuracy of the weighing machine. To a limited extent, this has been alleviated by increasing the number of scales, but this also escalates the cost, complexity, and size of the weigher.

It is known in such prior art apparatus to employ arithmetic means for selecting which combinations of discreet product groups will provide the preferred product weight. The most common selection logic is sequential; i.e., a final decision is made about the first discharge before a second discharge computation is made. Apparatus exemplifying the sequential selection process are described, for example, in U.S. Pat. Nos. 4,385,671; 4,396,078; 4,418,771; and 4,441,567. This approach has been known to limit packaging speed in cases where, having made a first discharge, no acceptable second discharge can be made without refilling the weighing scales.

The present invention effectively doubles machine output by computing two discharges simultaneously and thereby permitting the discharge of two packages for each scale cycle; without adversely affecting the accuracy of the weigher. Moreover, each scale is used in each machine cycle, thus reducing the costs of the weigher apparatus and its operation.

SUMMARY OF THE PRESENT INVENTION

Accordingly, it is an object of the present invention to provide an improved method of making up discrete quantities of solid product, each having a preferred weight, which readily overcomes the aforementioned problems.

It is a further object of the present invention to provide an improved method of operating weighing machines which efficiently utilizes all scales thereof in each machine cycle.

It is a further object of the present invention to provide a method of delivering two packages for each scale cycle.

It is still a further object of the present invention to provide a quicker and more efficient method of achieving desired weights of flowing product.

Further and additional objects will become apparent from the description, accompanying drawings, and appended claims.

In accordance with an embodiment of the invention, a weighing machine is utilized for producing a quantity of product having a predetermined weight. The preferred machine for use in practicing the method of the present invention is of the type disclosed in pending U.S. application Ser. No. 499,385, commonly owned by applicants' assignee and incorporated herein by reference. Said machine is partially described hereinbelow for purposes of illustration.

Feeder means supply product from a source. Multiple accumulator means receive the product from the feeder means and selectively discharge discrete amounts therefrom. Weighing-divertor means, one for each accumulator means, receive the discrete product amounts from the accumulator means, weigh them, and discharge the product in one of a plurality of directions. Holding chambers receive the product from the weighing-divertor means and selectively hold it until it is discharged. Collecting means receive the product from the holding means, consolidate it, and direct it to another location.

The present invention more particularly provides for selecting the best double group combination from the holding chambers and thereafter splitting the double group into two single groups, each containing a weight within the user's under/over weight allowances. In the preferred embodiment, the double group is selected from ordered, successive combinations of holding chambers, whereby each weighing scale is efficiently used in every machine cycle. For each such cycle, two packages are delivered by the machine.

From the description thus far provided, it is apparent that the proposed method of weighing may be advantageously used with different versions of weighing machines of the type discussed herein.

DESCRIPTION OF THE PREFERRED EMBODIMENT

Figure 1:
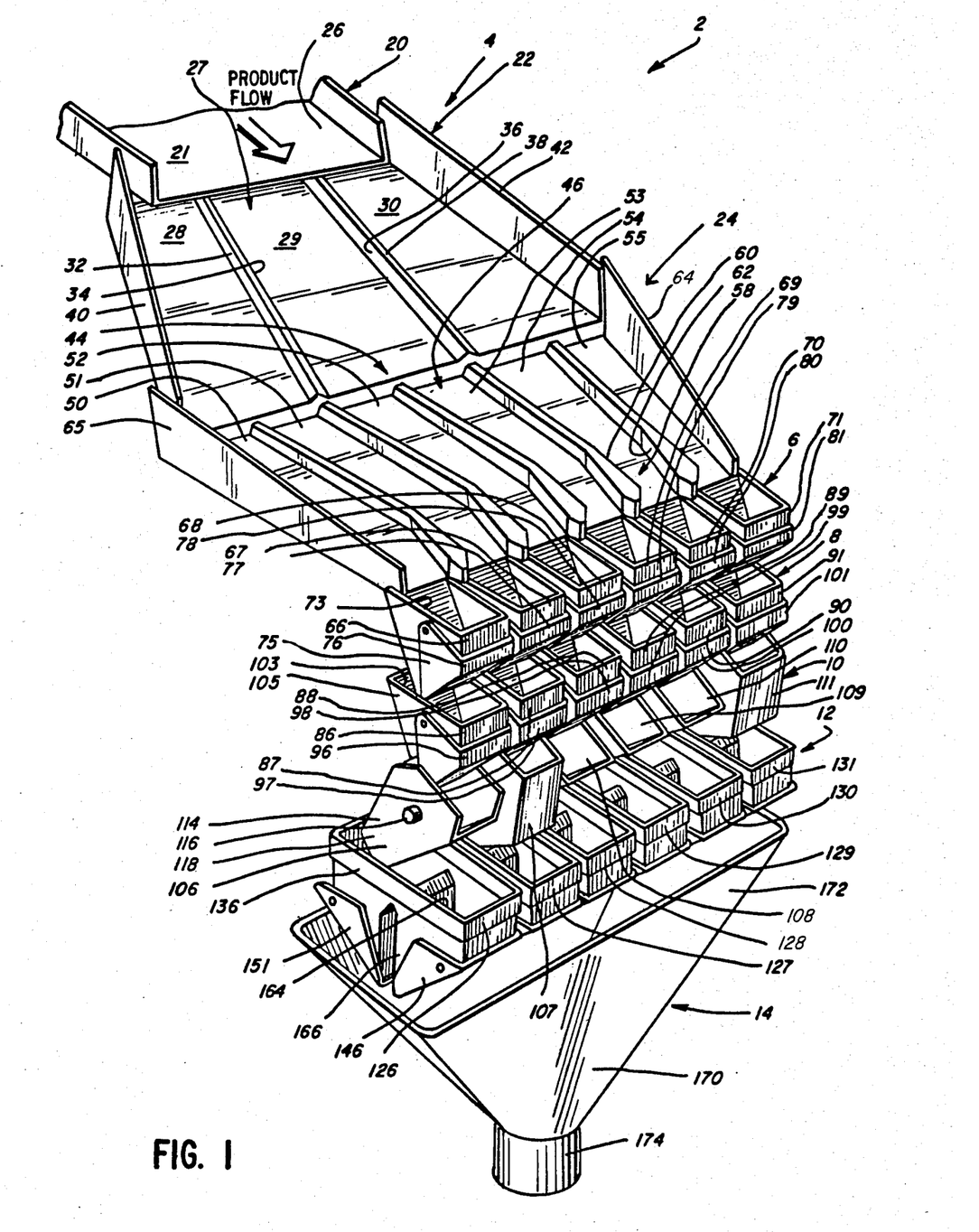
FIG. 1 is a perspective view of a weighing machine apparatus suitable for practicing the claimed method.
Figure 2:
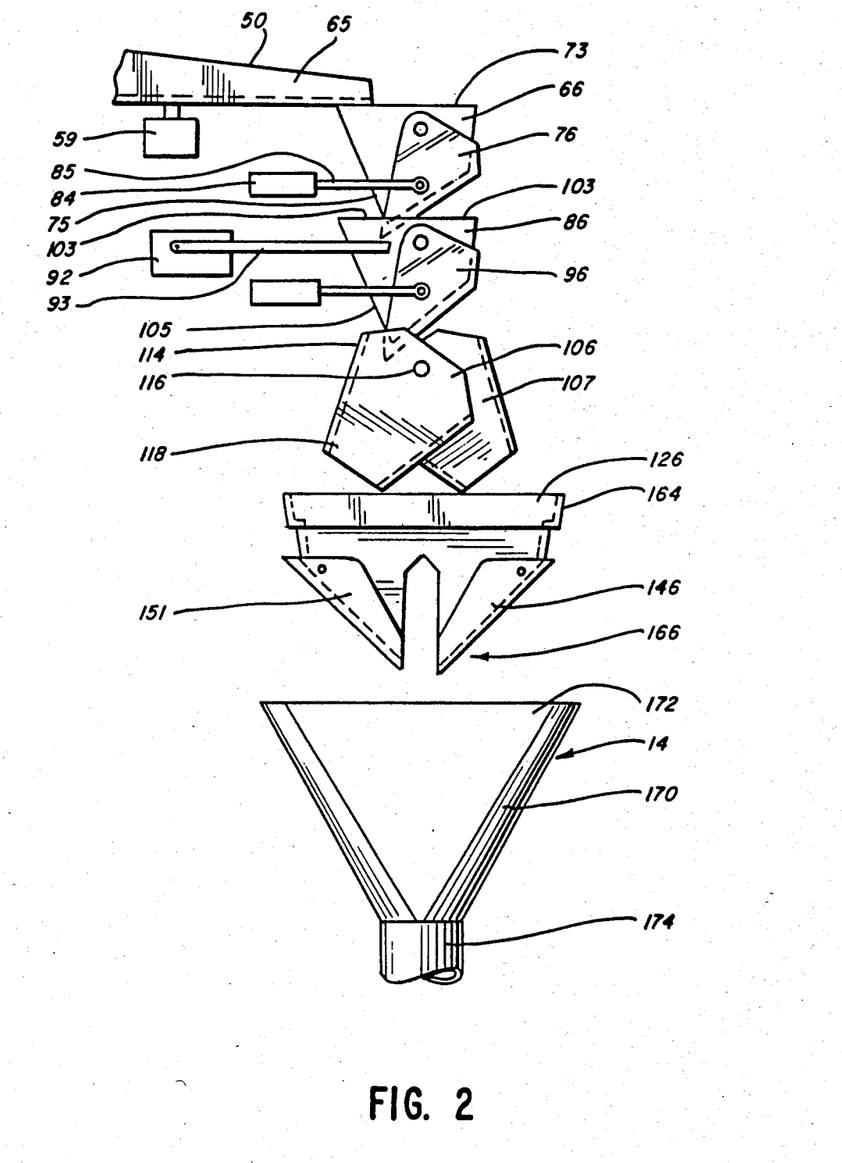
FIG. 2 is a side plan view of the embodiment shown in FIG. 1.

Referring to FIGS. 1 and 2, and using like numerals to designate like items, one machine which may be utilized with the method of the present invention, that disclosed in U.S. application Ser. No. 499,385, is shown. In major sections it includes, moving in the direction of product flow, an in-line tripartite feeder means 4, a side-by-side row of accumulating means 6, a side-by-side row of weighing means 8, a side-by-side row of pivotally mounted divertor means 10, two parallel rows of side-by-side holding means 12, and a collecting means 14. The necessary frame, support, and operational or control means have been omitted in all figures for clarity, as it would be clear to one skilled in the art how to incorporate the unillustrated features.

Before describing each section identified above, the in-line arrangement of the illustrated weighing machine 2 is to be noted. Product moves in a uniform flow cascading down through a series of sections that control or gate product flow. There is a linear transfer from one section to the next, and this avoids the problems inherent when changing from a linear flow to a radial flow or from a radial flow to a linear flow. The linear arrangement is also more compact, making it generally more compatible with other packaging equipment, and it permits one to make a more efficient use of plant space. In addition, most of the operating mechanisms are easily observed from the front of the machine, rather than being hidden in the interior of a machine having a circular configuration, and all of the operating mechanisims of the same type can be observed from a single side of the machine.

The in-line feeder means 4 includes three stages of vibratory product feed tray means 20, 22, 24. Individually and collectively they advance the product from the product source (not shown) to the row of accumulating means 6 in the direction of the arrow marked Product Flow. The first feed tray means 20 is a single tray 21 with upturned sides that advances product in response to downstream needs by a rapid vibrational motion, as is well known. A conventional vibrating means (not shown) is attached in a conventional manner and its amplitude and frequency of operation may be adjusted or altered as necessary or desirable to regulate the rate of product flow or to accommodate product having different handling characteristics. The vibrational motion of the tray 21 causes the product to spread itself evenly across the tray, both in the direction of product flow and in the transverse direction, to provide a relatively uniform flow of product. At the discharge end 26 of the tray 21 the product falls onto the collective entrance end 27 of the second feed tray means 22.

The second feed tray means 22 comprises three coextensive feed trays 28, 29, 30 disposed in a side-by-side relationship. Each tray 28, 29, 30 is physically isolated from the other, although their adjacent side portions protrude upwardly and overlap to prevent a loss of product therebetween. Specifically, the inner lateral edge 32 of outer tray 28 extends upwardly from the tray face and overlaps the adjacent upstanding lateral edge 34 of center tray 29. A similar overlapping arrangement exists for the other lateral edge 36 of the center tray 29 and the inner lateral edge 38 of the other outer tray 30. The exact configuration or degree of the overlap is discretionary, provided that product loss is minimized and that the trays do not interfere with one another either when vibrating or when stationary. The upward protrusion also assists in channeling or segregating product flow. The outer edges 40, 42 of the outer trays 28 and 30, respectively, are turned up to laterally contain the product flow. Each tray, 28, 29 and 30 of the second feed tray means 22, is operatively connected to an individual vibrator or other motion device so that each tray 28, 29 and 30 may operate independently of the others. The appropriate vibrator is energized in response to a downstream demand for product to advance product and to disperse it evenly in a direction transverse to product flow. This provides a relatively uniform flow of product at the collective discharge end 44 of the second tray means 22, where product falls onto the collective entrance ends 46 of the third feed tray means 24.

The third feed tray means 24 comprises six feed trays 50–55 disposed in a side-by-side relationship. Each tray 50–55 is physically isolated from the other, although their adjacent side portions protrude upwardly and overlap or abut each other to prevent a loss of product therebetween. The overlapping arrangement of the adjacent trays is similar to the overlapping arrangement aforenoted for the second feed tray means 22, and preferably protrudes upwardly to a greater height at least at the collective discharge end 58 to completely segregate product flow into six separate channels. For example, the lateral edges 60, 62 of tray 53 extend upwardly from the tray face. In a similar manner the adjacent lateral edges of trays 52 and 54 extend upwardly and may overlap the lateral edges of tray 53 to minimize product loss therebetween. The overlap should also permit independent operation of each tray 50–55 so that one may vibrate to advance product while its neighboring tray or trays remain stationary. The outer edges 64, 65 of the outermost trays 50 and 55, respectively, are turned up to laterally contain the product flow within the trays. The discharge ends of each tray may narrow slightly to concentrate the segregated product flow for transfer to the row of accumulating means 6 disposed thereunder and prevent the product from falling between the accumulators. Instead of narrowing the discharge ends, shields may be placed over the spaces between the accumulators to deflect the flow of material into the accumulators.

Each tray of the third tray means 24, as for the second tray means 22, is operatively connected to an individual vibrator 59 or other motion device so that each tray 50–55 may operate independently of the others. The appropriate vibrator is energized in response to a downstream demand for product to advance product and to further disperse it evenly. Product is discharged in a linear fashion from the collective discharge ends 58.

Taken as a unit, the entire tripartite feeder means 4 accepts product discharged onto first tray 21 by a product source, and evenly distributes it in the direction of product flow and transverse thereto. The three trays comprising the second feeder means 22 further disperse product flow and the upwardly protruding lateral tray edges begin to divide the flow into three channels. The height of the upward protrusions may be selected to permit limited overflow from one tray to another so that excess product will be laterally redistributed to areas of sparse product flow. The six trays 50–55, comprising the third feeder means 24, still further disperse product flow, and the upwardly protruding lateral tray edges segregate the product flow into six individually controlled channels. Thus, a non-uniform or erratic supply of product is converted into an even distribution of six relatively uniform, individually controlled product feeds.

The row of accumulating means 6 receives product from the superposed feeder means 4. The row of accumulating means 6 comprises a side-by-side row of six accumulators having bucket-like chambers 66–71 that are fixed to the frame of the weighing machine and disposed immediately below the discharge ends of the respective individual trays 50–55 of the third tray means 24. There is preferably one accumulator for each individual tray 50–55 of the third feed tray means 24. Each accumulator chamber, such as 66, has the shape of a hollow, generally triangular prism, with the top portion 73 being open to permit product to fall thereinto from its respective superposed feed tray, i.e., feed tray 50, of the third feed tray means 24. Each accumulator chamber has, on the bottom portion 75, an opening door 76–81 that is hinged on opposite sides thereof. The door swings out away from the bucket-like accumulator chamber, permitting the product deposited therein to slide downwardly to one of the weighing means 8 therebelow. The door of each accumulator is operatively attached to a separate mechanical or electromechanical device 84 to selectively open and close it independently of the doors on the other accumulators. A dual action pneumatic cylinder, electrical solenoid, or the like is suitable, and may be located on the opposite side of the accumulator as the door, with a bail 85 or other attachment to connect it to the door 76. Each individual door opens or remains in its normally closed position in response to downstream demands for product.

The row of weighing means 8 receives product from the superposed row of accumulating means 6, and determines the weight of each discrete amount of product deposited therein. The row of weighing means 8 comprises a side-by-side row of six scales with bucket-like chambers, i.e., weigh buckets, 86–91. Each weigh bucket is individually supported by a weight sensing means 92 by a connecting cantilevered arm 93 or the like. There is one scale for each accumulator, and each scale is disposed immediately below the bottom or discharge end 75 of each respective accumulator chamber to receive the contents thereof. The weight sensing means may be a load cell, balanced mass weigh cell, or a spring balanced weigh cell. The weigh buckets have a configuration similar to that of each accumulator chamber, including an open top portion 103 and a bottom portion 105 with an opening door 96–101. Each door is operatively attached to a device to selectively open and close it independently of the doors on the other weight buckets to release the product held therein. See U.S. Pat. No. 3,371,731 and U.S. Pat. No. Re. 27,506, both of which are incorporated herein by reference, for a description of a suitable weight sensing means. Each weigh bucket door 96–101 opens or remains in its normally closed position in response to downstream demands for product.

The row of divertor means 10 receives product from the superposed weighing means 8. The row of divertor means 10 comprise a side-by-side row of six divertors 106–111. There is one divertor for each scale, and each divertor is disposed immediately below the bottom or discharge end 105 of each respective scale to receive product therefrom. Each divertor, such as 106, is an elongated rectangular tube that is mounted near its upper, product receiving end 114 for pivotal movement around post 116. The divertor is bistable and pivots to position its lower, product delivering end 118 above one of two holding chambers therebeneath that comprise a part of the two rows of holding means 12. The pivoting action of the divertor is effected by conventional means, such as that disclosed to operate the doors 76–81, 96–101 on the accumulator chambers and weigh buckets. The upper end 114 is configured to receive and contain all of the product released by the respective superposed scale regardless of the position to which the divertor is directed. Each divertor moves in response to downstream demands for product.

The two rows of holding means 12 receive product from the superposed row of divertor means 10. The two rows of holding means 12 comprises two rows of side-by-side holding chambers 126–131, 136–141 arranged in a two-by-six matrix, for a total of twelve holding chambers. The holding chambers are fixed to the frame of the weighing machine and each is disposed immediately below one of the two discharge positions of the respective divertors. There are preferably two holding chambers for each divertor, and each pair is aligned in the direction of divertor movement, which is preferably in line with the general direction of product flow. Each of the twelve holding chambers, such as 126, has a configuration similar to that of each accumulator chamber, including an open top portion 164 and a bottom discharge portion 166 with an opening door 146 or 151. Each door is operatively attached to a device to selectively open and close it independently of the doors on the other holding chambers, in a manner as disclosed hereinbefore. For convenience, the holding chambers comprising a pair, such as 126, 136, may be back to back.

The collecting means 14 receives product from any of the superposed holding chambers 126–131, 136–141. It comprises a funnel-like chute portion 170 having an upper or mouth section 172 that encompasses all of the discharge portions of the two rows of holding means 12. The funnel-like chute portion 170 tapers to a common feed tube 174 that consolidates the product released by the various holding chambers and directs or conveys it to another location, such as a packaging machine or other filling apparatus.

Figure 3:
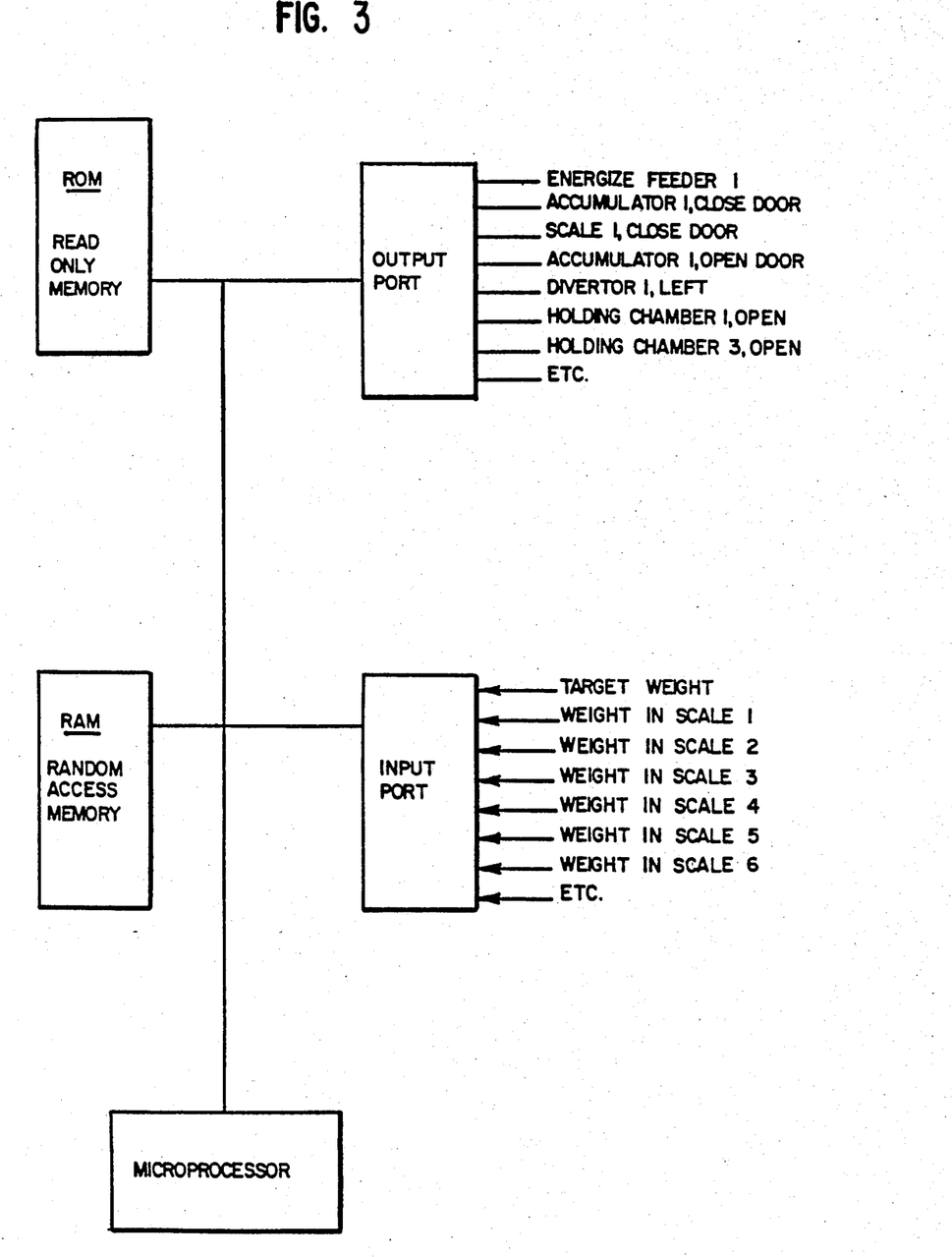
FIG. 3 is an exemplary operational system that may be utilized with the present invention.

FIG. 3 illustrates a sample operational means for a weighing machine as heretofore described. It is to be understood that this block diagram is exemplary of a representative operational means that utilizes a microprocessor. As would be clear to one skilled in the art, a variety of microprocessors and other peripheral equipment could be used, as could any number of discrete logic systems. This is attested to by other weighers that are publicly available as described in, for example, U.S. Pat. Nos. 3,939,928; 3,974,888; 4,106,628; and 4,206,822. The overall purpose of the operational means is to select the holding chambers which will discharge the contents thereof into the collecting means on any particular machine cycle, to cause that discharge to occur, and to regulate the flow of material to the holding chambers. Which holding chambers are discharged depends upon which combination of fractional weights therein results in the preferred weights of the two packages to be discharged. After two packages are discharged, the appropriate feeder trays, accumulators, scales, and divertors are energized as necessary to replenish the emptied holding chambers.

As illustrated in FIG. 3, a microprocessor system is used to monitor and control the status of various components of the weighing machine via the input and output ports and may also be used to monitor input signals from related packaging machinery. For instance, the system may direct the feeder means to be energized, open or close a door of a particular accumulator chamber, weigh bucket, or holding chamber, position a divertor, etc. The system may receive information regarding the weight of the product in the weigh buckets and the status of various components of the weigher from various sensing devices on the weigher. Other information may be supplied through a read only memory or a manual keyboard. This may include information unique to the product being weighed, the target weight, the range of acceptable weights, the length of time or amplitude of vibration for the feeder trays, various characteristics of the product being weighed, etc. A random access memory is used by the microprocessor to carry out its functions and may be used to store information such as which doors are open on which accumulator chambers, weigh buckets, or holding chambers; which holding chamber each divertor is directed to; the weight of the product in each weigh bucket and holding chamber; etc. The random access memory may also be used to assist in carrying out the various calculations to determine the optimum combination of weights in the holding chambers that will yield an acceptable double group weight and thereafter the preferred package weight. It is apparent that the steps taken in the monitoring and control of the weighing, and their sequence, may be determined by one skilled in the art to accomplish the desired results or implement the desired features. This is true whether one utilizes a microprocessor, discrete logic, or any other means to govern the operation of the weighing machine.

In the double group split logic of the present invention, it is desirable to have all twelve holding chambers full before determining any acceptable weight discharges. Thus, after two discharges are delivered, the empty holding chambers are refilled from their respective scales. Since there are only six scales and only six chambers can be refilled in one machine cycle, the preferred method of practicing the present invention contemplates that the holding chambers to be totaled be six or fewer in number and that they be chosen in such a way as to use only one holding chamber corresponding to each scale. While one holding chamber is being discharged, the other may be filled. By thus selecting the double group combination from ordered, successive combinations of holding chambers, each scale is efficiently used in every machine cycle.

Figure 4:
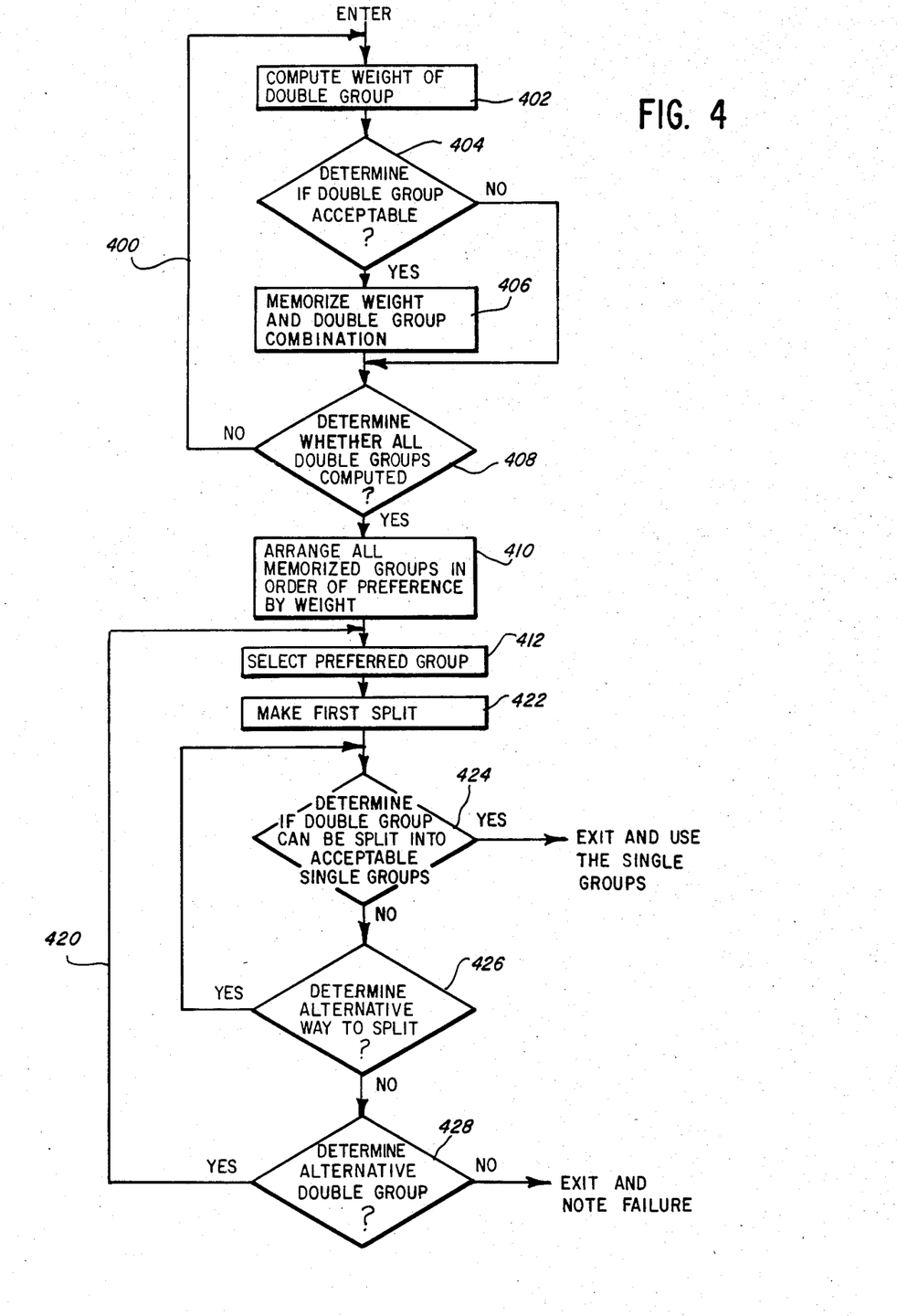
FIG. 4 is a flow diagram of a portion of the operational system of FIG. 3.

In operation, the aforementioned microprocessor system operates in accordance with a program such as is illustrated in the flow chart of FIG. 4. Prior to entry into this program, the microprocessor has been inputted with the target package and target double product weights and acceptable ranges therefor. Additionally, the microprocessor has stored within it the weight of product located in each of the holding chambers 126–131 and 136–141.

In operating loop 400, the microprocessor computes all possible double group combinations having weights within the acceptable range. In step 402, the microprocessor computes the weight for a single double group combination of the holding chambers. The computed weight is then measured, in step 404, against the acceptable limits. If acceptable, the computed double product weight is recorded in the memory of the microprocessor at step 406. If unacceptable at step 404 or once recorded at step 406, step 408 then determines whether all possible double groups have been computed and tested for acceptability. Operating loop 400 continues to run until all double groups for a single machine cycle have been computed and, if acceptable, recorded.

At step 410, the recorded double groups are arranged in an order of preference. The first preferred is the double group or double groups containing exactly twice the package weight. Generally for most applications, the next preferred is the double group or double groups containing exactly twice the package weight plus one additional weight increment.

After step 410, the microprocessor is programmed to enter into loop 420, wherein two acceptable single groups are split from a preferred double group to yield two discharges each containing a package weight within the user's under/over weight allowances. The most preferred group is selected at step 412 and a first split is made at step 422. Any of a number of known ways to split the double group are within the scope of this invention. For example, it is possible to split the double group so as to make the most even split, thus providing two relatively average weights rather than one exceptionally good weight and a second near-limit weight. It has nevertheless been observed that one may accept the first way to split which succeeds because the average overweight for each of the two packages is the same. Once the preferred double group is split one way, the two single groups are tested at step 424 to see whether the single groups fall within the acceptable ranges therefor. If this is the case, then loop 420 is exited and the two single groups are discharged to form two packages. If the split is unacceptable, step 426 considers an alternative split and runs it through step 424 again. If no alternative split will work, step 428 selects an alternative double group from the next preferred group from step 410 and loop 420 is repeated. If all possible double groups fail to work, the microprocessor simply abandons the double group split logic approach and substitutes some other means, such as a single discharge for example, to permit machine operation to continue.

It will be appreciated that the double discharge concept can similarly be used on a machine of the same type having, say, 8 scales and 16 holding chambers. Moreover, the double discharge concept can be expanded to cover multiple discharges from one filling of such a machine's holding chambers. For example, a machine having 9 scales and 18 holding chambers could be used to split a triple group of 9 chambers into 3 discharges of 3 chambers each before refilling its chambers. Given the fact that the scale cycle is the slowest portion of the machine cycle, it can readily be seen that the multiple-/double discharge method, with its efficient scale utilization, increases machine speed significantly.

As an alternative to the foregoing double group split logic, the objectives of the present invention are also achieved by a sequential machine logic which computes all possible first and consequential second discharges before making a final decision about the first. Such an approach would also permit the selection of two acceptable discharges. This is in contrast to prior art apparatus which calculate a first acceptable discharge without regard to the availability of subsequent discharges from available product. The possible discharges may also be computed with the restriction that only one holding chamber from each pair of chambers fed by a single scale may be used in both groups.

For the purposes of this description, and referring back to FIG. 1, assume that the product of holding chambers 126, 127, 128 and 139 are selected for delivery in a double discharge cycle. Under control of the microprocessor system, the contents of those holding chambers are discharged into the collecting means by opening the doors 146, 152, 148 and 154 at the bottom of the holding chambers for a short period of time. The divertors 106–109 are positioned as necessary to fill the now empty holding chambers, and the doors 96–99 of the weigh buckets 86–89 are then opened for a brief period of time to permit the contents of the weigh buckets to be discharged into the appropriate holding chambers. Following that, the doors 76–79 of the accumulator chambers 66–69 are opened permitting the contents of the associated accumulators to fall into the previously empty weigh buckets, and the accumulator doors are then closed. The scales are allowed to settle and the weight of material in each one is measured. While the settling and weighing occurs, the trays 50, 51, 52 which correspond to the empty accumulators are vibrated for a period of time, depending upon the type of product, its handling characteristics, and the target weight. This transfers product into the previously emptied accumulators.

While the trays 50, 51, 52 corresponding to the empty accumulator chambers 66, 67, 68 are vibrating, the remaining trays 53, 54, 55 do not vibrate so that any product that might drop on the remaining trays will rest on their receiving ends. Moreover, any product inadvertently falling off the discharge end of the remaining trays 53, 54, 55 is caught in the corresponding accumulator chambers 69, 70, 71. While trays 50, 51, 52 corresponding to the empty accumulators are vibrating, the ones of trays 28, 29, and 30 corresponding to trays 50, 51, 52, i.e., trays 28 and 29, are also vibrating to supply product thereto. The tray 30 does not vibrate because all the holding chambers supplied by it are full. Product drops off the discharge ends of feed trays 28, 29 onto feed trays 50, 51, 52, 53 of the third feed tray means. Product is supplied from a source to the weighing machine at a first feed tray 20 which also advances and evenly distributes the product by vibrating in a predetermined and well known manner. Product drops off the discharge end 26 in a relatively uniform curtain-like flow onto the three feed trays 28, 29, 30 of the second feed tray means.

The aforementioned microprocessor system also has the ability to control the operation of the feed means 4 and the feed tray means 20, 22, and 24 in a servo system in response to the weight of product being measured by the weighing means. The servo system is comprised of essentially two control mechanisms.

The first of the control mechanisms operates with a relatively slow response time. As mentioned, there is an optimum number of holding chambers which will, on average, be used to make up the preferred weight. The target weight divided by that optimum number yields a target fractional weight. In the first control mechanism, the microprocessor is effective to add together all the fractional weights presently in all the scales and holding chambers of the machine and divide that total weight by the number of fractional weights present, i.e., the sum of the number of scales and holding chambers that presently contain product. This quotient is the average fractional weight. The vibrator feed of the feed tray means is then adjusted by the microprocessor in either time or amplitude in response to the deviation of the average fractional weight from the target fractional weight. The purpose of this first control mechanism is to insure that, on average, product from the optimal number of chambers is combined to make up the preferred weight.

The second of the control mechanisms operates with a relatively fast response time. Its purpose is to attempt to correct a situation where the average fractional weight on a particular machine cycle is excessively high or low. When the average fractional weight is excessively high, it reduces the amount of product fed to the accumulator during the next machine cycle to give a set of low fractional weights for use with the high fractional weight already in the machine to make up the preferred weight. When the average fractional weight is excessively low, it increases the amount of product fed to the accumulators during the present machine cycle to give a set of high fractional weights for use with the low fractional weights already in the machine to make up the preferred weight. The increase in product fed to the accumulator may be referred to as a spurt feed. It will be noticed that in the case of excessively high fractional weights, the set of low fractional weights is not available for combination into the preferred weight until two machine cycles later, whereas in the case of excessively low fractional weights, the set of high fractional weights will be available for combination into the preferred weight on the next machine cycle.

Figure 5:
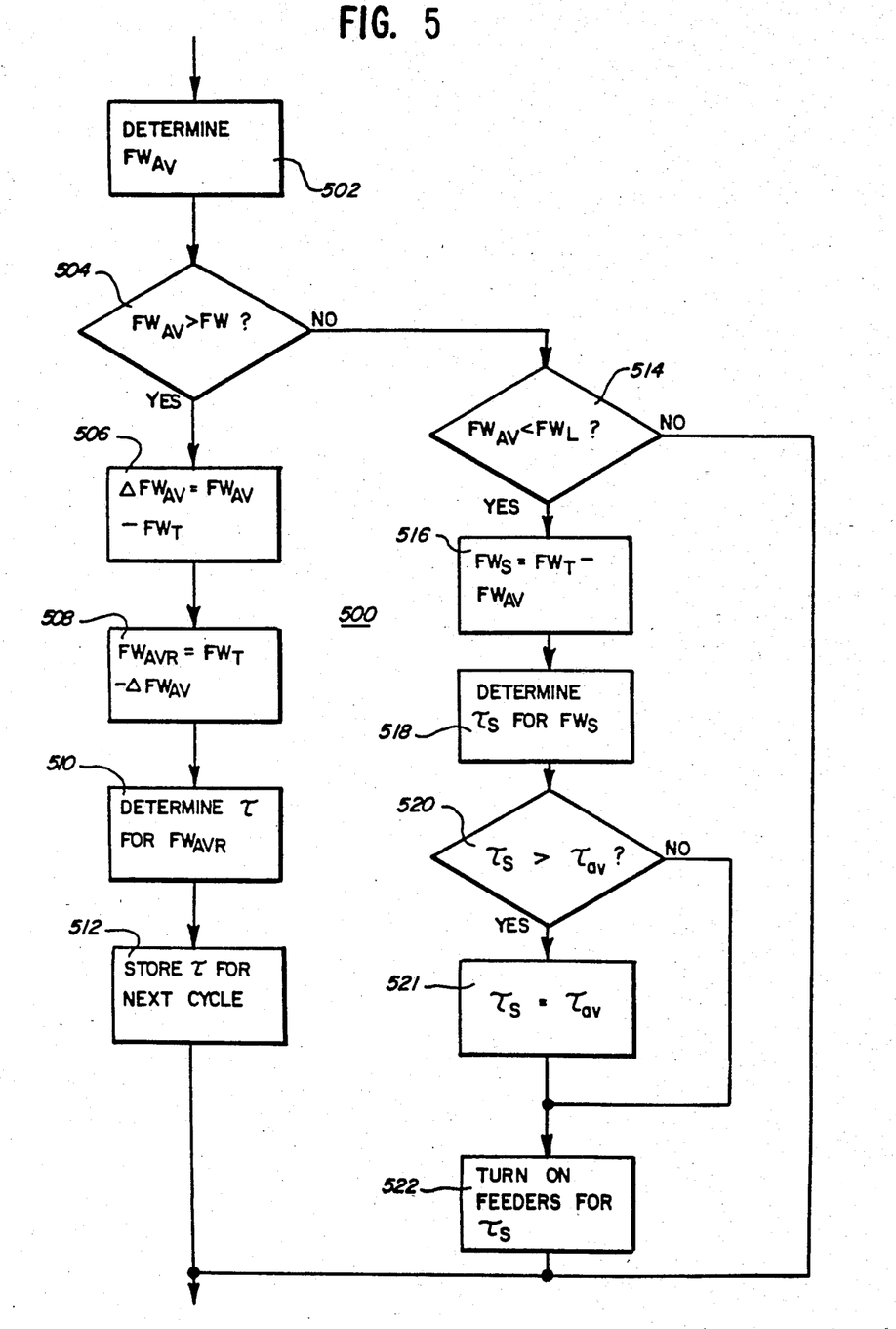
FIG. 5 is a flow diagram of another portion of the operational system of FIG. 3.

FIG. 5 is a flow diagram for the second control mechanism 500. The microprocessor first determines the average fractional weight present in the scales and holding chambers that presently contain product or will contain product at the end of a machine cycle, $FW_{AV}$, in block 502. The average fractional weight over which this second control mechanism is to provide correction, $FW_H$, as well as the average fractional weight under which this second control mechanism is to provide correction, $FW_L$, are both provided either through the manual keyboard or the ROM. Decision block 504 then compares $FW_{AV}$ and $FW_H$. If $FW_{AV}$ exceeds $FW_H$, the remainder of the control mechanism operates to determine the time of feeder operation, $\tau$, for the next machine cycle. Block 506 determines the difference, $\Delta FW_{AV}$, between the average fractional weight and the target fractional weight; block 508 determines the desired reduced average fractional weight for the next machine cycle, $FW_{AVR}$, as the difference between the target fractional weight, $FW_T$, and $\Delta FW_{AV}$; block 510 determines the time of feeder operation, $\tau$, required on the next machine cycle to feed the reduced average fractional weight, $FW_{AVR}$, of product to the accumulator on the next machine cycle, and block 512 then stores that value of $\tau$ for use during the next machine cycle. However, if the result of division of block 504 is that the average fractional weight, $FW_{AV}$, does not exceed $FW_L$, division block 514 operates to determine if $FW_{AV}$ is less than $FW_L$. If not, second control mechanism 500 is exited, but if so, block 516-522 determine the period for which the feeder means should spurt feed the accumulator means during the present machine cycle. In particular, block 516 determines the fractional weight needed to be fed to the accumulator means, $FW_S$, by subtracting the average fractional weight $FW_{AV}$, from the target fractional weight, $FW_T$. Block 518 determines the time $\tau_S$ the feeder means should be spurt fed to supply to the accumulator means the weight $FW_S$, of product. Decision block 520 determines whether the determined $\tau_S$ exceeds the maximum time available for spurt feed, $\tau_{av}$; if so, the block 521 sets $\tau_S$ equal to $\tau_{av}$ and block 522 turns on the feeder means for $\tau_S$, but if not the block 522 simply turns in the feeder means for $\tau_S$. The second control mechanism 500 is then exited.

Utilizing the double group split logic of the present invention, the weighing machine will deliver two packages for each scale cycle. Inasmuch as the scale cycle is the slowest portion of the machine cycle, the machine's output is almost doubled using the method of the present invention. Since each scale is used in each cycle, a lower capital equipment investment is achieved with the concurrent boost in production and efficiency.

While the invention has heretofore been described in detail with particular reference to illustrated machines and operational methods, it is to be understood that variations, modifications, and the use of equivalent mechanisms can be effected without departing from the scope of this invention. For instance, one may use other weighing machines of the type described herein and one may use any number of known electromechanical systems to monitor and govern the operation of the weighing machine.

What is claimed is:

1. A method for making up multiple discrete quantities of solid product, each having a preferred product weight, from a plurality of product holding chambers without refilling such product holding chambers, said method comprising the steps of:
    (a) establishing an acceptable range of the preferred product weight to be delivered from a single group of holding chambers;
    (b) establishing an acceptable range of a multiple product weight to be delivered from a multiple group of holding chambers;
    (c) registering the weight of product stored in each of said holding chambers;
    (d) calculating a multiple group combination of said holding chambers having a multiple product weight within the acceptable range established therefor;
    (e) splitting said multiple group combination to yield multiple single groups of holding chambers which each have a preferred product weight within the acceptable range established therefor; and
    (f) making up multiple discrete quantities of said product from said multiple single groups of said holding chambers comprising said multiple group combination.

2. A method for making up two discrete quantities of solid product, each having a preferred product weight, from a plurality of product holding chambers without refilling such product holding chambers, said method comprising the steps of:
    (a) establishing an acceptable range of the preferred product weight to be delivered from a single group of holding chambers;
    (b) establishing an acceptable range of a double product weight to be delivered from a double group of holding chambers;
    (c) registering the weight of product stored in each of said holding chambers;
    (d) calculating a double group combination of said holding chambers having a double product weight within the acceptable range established therefor;
    (e) splitting said double group combination to yield two single groups of holding chambers which each have a preferred product weight within the acceptable range established therefor; and (f) making up two discrete quantities of said product from said two single groups of said holding chambers comprising said double group combination.

3. A method for making up two discrete quantities of solid product, each having a preferred product weight, from a plurality of product holding chambers without refilling such product holding chambers, said method comprising the steps of:

(a) establishing an acceptable range of the preferred product weight to be delivered from a single group of holding chambers;

(b) establishing an acceptable range of a double product weight to be delivered from a double group of holding chambers;

(c) registering the weight of product stored in each of said holding chambers;

(d) calculating successive combinations of the registered product weights of said holding chambers and registering the weights of those double group combinations having a double product weight within the acceptable range established therefor;

(e) selecting the first registered double group which may be split to yield two single groups which each have a preferred product weight within the acceptable range established therefor; and (f) making up two discrete quantities of said product from said two single groups of said holding chambers comprising said double group combination.

4. A method for making up two discrete quantities of solid product, each having a preferred product weight, from a plurality of product holding chambers without refilling such product holding chambers, said method comprising the steps of:

(a) establishing an acceptable range of the preferred product weight to be delivered from a single group of holding chambers;

(b) establishing an acceptable range of a double product weight to be delivered from a double group of holding chambers;

(c) registering the weight of product stored in each of said holding chambers;

(d) calculating successive combinations of the registered product weights of said holding chambers and registering the weights of those double group combinations having a double product weight within the acceptable range established therefor;

(e) arranging said double groups in an order of preference;

(f) successively and in said order of preference, testing each double group to select the first double group which may be split to yield two single groups which each have a preferred product weight within the acceptable range established therefor; and (g) making up two discrete quantities of said product from said two single groups of said holding chambers comprising said first double group.

5. The method of claim 4 wherein the preferred order of arranging said double groups favors a double group of exactly twice the preferred product weight.

6. The method of claim 4 further comprising the step of selecting the most even split of said first double group into two single groups which each have a preferred product weight within the acceptable range established therefor.

7. The method of claim 4 further comprising the step of ordering successive combinations of holding chambers whose weights are to be totaled, whereby all of the weighing scales feeding such holding chambers are continuously operational.

8. A method for making up multiple discrete quantities of solid product, each having a preferred product weight, from a plurality of product holding chambers without refilling such product holding chambers, said method comprising the steps of:

(a) establishing an acceptable range of product weight to be delivered from a single group of holding chambers;

(b) registering the weight of product stored in each of said holding chambers;

(c) calculating all possible first combinations of holding chambers having a product weight within the acceptable range established therefor;

(d) calculating all possible subsequent combinations which are available after the calculation of said first combination of holding chambers and which also have a product weight within the acceptable range established therefor;

(e) selecting a said first acceptable combination which yields a desired number of said subsequent acceptable combinations of holding chambers; and (f) making up multiple discrete quantities of said product from said selected first and subsequent combinations of holding chambers.

9. A method for making up two discrete quantities of solid product, each having a preferred product weight, from a plurality of product holding chambers without refilling such product holding chambers, said method comprising the steps of:

(a) establishing an acceptable range of product weight to be delivered from a single group of holding chambers;

(b) registering the weight of product stored in each of said holding chambers;

(c) calculating all possible first combinations of holding chambers having a product weight within the acceptable range established therefor;

(d) calculating all possible second combinations which are available after the calculation of said first combination of holding chambers and which also have a product weight within the acceptable range established therefor;

(e) selecting a said first acceptable combination which yields a said second acceptable combination of holding chambers; and (f) making up two discrete quantities of said product from said selected first and second combinations of holding chambers.

* * * * *